United States Patent
Han et al.

(10) Patent No.: US 10,068,312 B2
(45) Date of Patent: Sep. 4, 2018

(54) IMAGE PROCESSING APPARATUS, IMAGE PROCESSING METHOD, AND COMPUTER-READABLE RECORDING MEDIUM

(71) Applicant: SAMSUNG ELECTRONICS CO., LTD., Suwon-si (KR)

(72) Inventors: Young-seok Han, Yongin-si (KR); Jong-ho Kim, Suwon-si (KR); Se-hyeok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 98 days.

(21) Appl. No.: 15/211,020

(22) Filed: Jul. 15, 2016

(65) Prior Publication Data
US 2017/0084004 A1 Mar. 23, 2017

(30) Foreign Application Priority Data
Sep. 17, 2015 (KR) ........................ 10-2015-0131400

(51) Int. Cl.
*G06K 9/48* (2006.01)
*G06T 3/40* (2006.01)

(52) U.S. Cl.
CPC .................................... *G06T 3/403* (2013.01)

(58) Field of Classification Search
CPC .. G06T 3/40; G06T 5/003; G06T 7/13; G06T 2207/20192; G06T 3/403; G06T 5/002; H04N 1/4092; H04N 1/40068; H04N 1/00469; H04N 1/393; H04N 1/58; G06K 15/1223; G06K 2215/0057

USPC .................................................. 382/199, 298
See application file for complete search history.

(56) References Cited

U.S. PATENT DOCUMENTS

| | | | |
|---|---|---|---|
| 5,410,615 A * | 4/1995 | Mailloux | G06T 3/4023 358/451 |
| 5,844,307 A | 12/1998 | Suzuki et al. | |
| 6,233,365 B1 * | 5/2001 | Teruhiko | G06T 3/403 382/156 |
| 6,574,366 B1 | 6/2003 | Fan | |
| 7,408,672 B2 * | 8/2008 | Ito | G06T 3/403 358/1.2 |
| 7,646,890 B2 | 1/2010 | Kobayashi et al. | |
| 7,945,095 B2 | 5/2011 | Hirao | |

(Continued)

FOREIGN PATENT DOCUMENTS

| | | |
|---|---|---|
| JP | 6-38055 A | 2/1994 |
| JP | 6-337936 A | 12/1994 |

(Continued)

*Primary Examiner* — Daniel Mariam
(74) *Attorney, Agent, or Firm* — Sughrue Mion, PLLC

(57) ABSTRACT

An image processing apparatus which is capable of providing images with enhanced resolution and enhanced sharpness is provided. The image processing apparatus includes an inputter configured to receive an input of image data, an up-scaler configured to up-scale the inputted image data, a region sense unit configured to sense an edge region and a line region within the up-scaled image data by extracting brightness information of the up-scaled image data, an image corrector configured to correct the up-scaled image data in different correction methods for each of the edge region and the line region, and an outputter configured to output the corrected image data.

17 Claims, 13 Drawing Sheets

(56) References Cited

U.S. PATENT DOCUMENTS

| | | | |
|---|---|---|---|
| 8,120,665 B2 | 2/2012 | Maruyama et al. | |
| 8,218,820 B2 | 7/2012 | Hayashi et al. | |
| 8,223,167 B2 | 7/2012 | Ogino et al. | |
| 8,244,073 B2 | 8/2012 | Okamura | |
| 8,295,646 B2 * | 10/2012 | Kawabe | H04N 1/40068 382/298 |
| 8,306,352 B2 | 11/2012 | Jung et al. | |
| 8,588,469 B2 | 11/2013 | Hayashi et al. | |
| 8,737,768 B2 | 5/2014 | Gomi | |
| 9,083,913 B2 | 7/2015 | Tsukada et al. | |
| 9,342,750 B2 | 5/2016 | Moon et al. | |
| 9,552,625 B2 * | 1/2017 | Peng | G06T 3/4053 |
| 2006/0233425 A1 | 10/2006 | Kobayashi et al. | |
| 2007/0200957 A1 | 8/2007 | Sim | |
| 2008/0180455 A1 | 7/2008 | Ogino et al. | |
| 2008/0273811 A1 | 11/2008 | Jung et al. | |
| 2009/0175542 A1 | 7/2009 | Okamura | |
| 2009/0208128 A1 | 8/2009 | Hayashi et al. | |
| 2009/0225180 A1 | 9/2009 | Maruyama et al. | |
| 2009/0316049 A1 | 12/2009 | Fuji | |
| 2010/0322536 A1 * | 12/2010 | Tezuka | G06T 3/00 382/300 |
| 2012/0155762 A1 | 6/2012 | Tsukada et al. | |
| 2012/0275720 A1 | 11/2012 | Hayashi et al. | |
| 2013/0128045 A1 | 5/2013 | Habbu et al. | |
| 2014/0161359 A1 | 6/2014 | Magri et al. | |
| 2015/0125079 A1 | 5/2015 | Moon et al. | |
| 2015/0161770 A1 | 6/2015 | Suzuki | |

FOREIGN PATENT DOCUMENTS

| | | |
|---|---|---|
| JP | 11-289468 A | 10/1999 |
| JP | 11-328424 A | 11/1999 |
| JP | 2000-253279 A | 9/2000 |
| JP | 2000-285232 A | 10/2000 |
| JP | 2005-91181 A | 4/2005 |
| JP | 2006-301722 A | 11/2006 |
| JP | 2008-185973 A | 8/2008 |
| JP | 2013-150361 A | 8/2013 |
| KR | 1998-039508 A | 8/1998 |
| KR | 10-0206049 B1 | 7/1999 |
| KR | 10-0771867 B1 | 11/2007 |
| KR | 10-0780151 B1 | 11/2007 |
| KR | 10-2009-0025252 A | 3/2009 |
| KR | 10-2009-0088812 A | 8/2009 |
| KR | 10-0947002 B1 | 3/2010 |
| KR | 10-1020496 B1 | 3/2011 |
| KR | 10-2012-0042988 A | 5/2012 |
| KR | 10-1482248 B1 | 1/2015 |
| KR | 10-1482448 B1 | 1/2015 |
| KR | 10-2015-0067055 A | 6/2015 |
| WO | 2011/021518 A1 | 2/2011 |

\* cited by examiner

IMAGE PROCESSING APPARATUS, IMAGE PROCESSING METHOD, AND COMPUTER-READABLE RECORDING MEDIUM

CROSS-REFERENCE TO RELATED APPLICATION

This application claims priority from Korean Patent Application No. 10-2015-0131400, filed on Sep. 17, 2015 in the Korean Intellectual Property Office, the disclosure of which is incorporated herein by reference in its entirety.

BACKGROUND

1. Field

Apparatuses and methods consistent with exemplary embodiments relate to image processing, and more particularly, to an image processing apparatus, an image processing method and a computer-readable recording medium for adjusting a width and signal strength in the transient segment of an image signal.

2. Description of the Related Art

The enhancement in the electronic technology has enabled development and distribution of various types of electronic apparatuses. Specifically, a display apparatus such as a TV as one of the most frequently-used electronic apparatuses at homes has been fast advanced for the recent several years.

Demand for higher performance of display apparatuses required more researches to find ways to enhance image quality of the display apparatus.

Most images have lower resolution than display environment due to limited resolution of image processing apparatus or limited specification for image signal transmission. When such low-resolution image is expressed on a high-resolution display, up-scaling causes resolution degradation.

Generally, in order to compensate for such resolution degradation, a method of detecting transient segment of the image and reducing the width of the transient segment has been used. However, this can cause sharpness degradation of image, and side-effects such as shoot or ringing occur.

Accordingly, a technology which can enhance both resolution and sharpness at the same time without having side-effect such as shoot or ringing in the transient segment transformation of an image is necessary.

SUMMARY

Exemplary embodiments overcome the above problems and/or disadvantages and other disadvantages not described above. Also, the exemplary embodiments are not required to overcome the disadvantages described above, and may not overcome any of the problems described above.

According to an aspect of an exemplary embodiment, there is provided an image processing apparatus including an inputter configured to receive an input of image data, an up-scaler configured to up-scale the inputted image data, a region sense unit configured to sense an edge region and a line region within the up-scaled image data by extracting brightness information of the up-scaled image data, an image corrector configured to correct the up-scaled image data in different correction methods for each of the edge region and the line region, and an outputter configured to output the corrected image data.

The region sense unit may sense from the extracted brightness information a region having a brightness value changed by a preset value or greater, sense it as the edge region if a symbol of a gradient of the brightness value within the sensed region is maintained, and sense it as the line region if the symbol of the gradient of the brightness value within the sensed region is changed.

With respect to the region sensed as the edge region, the image corrector may perform a correction of narrowing a width of the sensed region by moving one of boundaries of the edge region in a direction from outside toward the edge region.

With respect to the region sensed as the line region, the image corrector may perform a correction of narrowing a width of the sensed region by moving boundaries on both sides of the line region in a direction from outside toward the line region.

With respect to the region sensed as the line region, the region sense unit may distinguish whether the line is a black line or a white line.

The image corrector may narrow a width of the sensed region, if the line is a black line, by moving a boundary of a region having a gradient brightness value with a negative symbol to a right side and moving a boundary of a region having the gradient brightness value with a positive symbol to a left side, and if the line is a white line, the image corrector may narrow the width of the sensed region by moving a boundary of the region having the gradient of brightness value with a negative symbol to the left side, and moving a boundary of the region having the gradient of brightness value with a positive symbol to the right side.

With respect to the region sensed as the line region, the image corrector may perform a correction of increasing an absolute value of the brightness value of the region having the narrowed width.

The image corrector may perform the correction of increasing the absolute value of the brightness value of the region by obtaining an average of brightness values of adjacent pixels right and left to a reference pixel having a zero gradient of the brightness value within the region of the narrowed width, and a difference between the brightness value of the reference pixel and the average, and adding a preset ratio of the difference to the brightness value of the reference pixel.

According to an aspect of an exemplary embodiment, there is provided an image processing method, the method including receiving an input of image data, up-scaling the inputted image data, extracting brightness information of the up-scaled image data, sensing an edge region and a line region within the up-scaled image data using the extracted brightness information, correcting the up-scaled image data in different correction methods for each of the edge region and the line region, and outputting the corrected image data.

Sensing the edge region and the line region may include sensing, from the extracted brightness information, a region having a brightness value changed by a preset value or greater, and sensing it as the edge region if a symbol of a gradient of the brightness value within the sensed region is maintained, and sensing it as the line region if the symbol of the gradient of the brightness value within the sensed region is changed.

With respect to the region sensed as the edge region, the correcting the up-scaled image may include performing a correction of narrowing a width of the sensed region by moving one of boundaries of the edge region in a direction from outside toward the edge region.

With respect to the region sensed as the line region, the correcting the up-scaled image may include performing a correction of narrowing a width of the sensed region by moving boundaries on both sides of the line region in a direction from outside toward the line region.

With respect to the region sensed as the line region, the sensing the edge region and the line region may include distinguishing whether the line is a black line or a white line.

The correcting the up-scaled image may include, if the line is a black line, moving a boundary of a region having a gradient brightness value with a negative symbol to a right side and moving a boundary of a region having the gradient brightness value with a positive symbol to a left side, and if the line is a white line, the correcting the up-scaled image comprises moving a boundary of the region having the gradient of brightness value with a negative symbol to the left side, and moving a boundary of the region having the gradient of brightness value with a positive symbol to the right side.

With respect to the region sensed as the line region, the correcting the up-scaled image may include performing a correction of increasing an absolute value of the brightness value of the region having the narrowed width.

The correcting the up-scaled image may include performing the correction of increasing the absolute value of the brightness value of the region by obtaining an average of brightness values of adjacent pixels right and left to a reference pixel having a zero gradient of the brightness value within the region of the narrowed width, and a difference between the brightness value of the reference pixel and the average, and adding a preset ratio of the difference to the brightness value of the reference pixel.

According to an aspect of an exemplary embodiment, there is provided a non-transitory computer-readable recording medium including a program to implement an image processing method, the method including receiving an input of image data, up-scaling the inputted image data, extracting brightness information of the up-scaled image data, sensing an edge region and a line region within the up-scaled image data using the extracted brightness information, correcting the up-scaled image data in different correction methods for each of the edge region and the line region, and outputting the corrected image data.

BRIEF DESCRIPTION OF THE DRAWINGS

The above and/or other aspects will be more apparent by describing in detail exemplary embodiments with reference to the accompanying drawings, in which.

DETAILED DESCRIPTION OF EXEMPLARY EMBODIMENTS

Figure 1A:
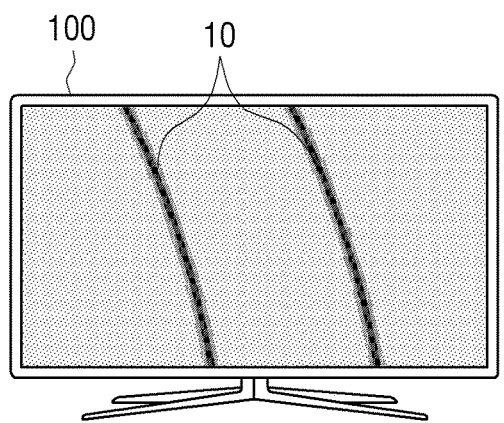
FIGS. 1A and 1B are schematic diagrams illustrating an operation of an image processing apparatus according to an exemplary embodiment.

Certain exemplary embodiments will now be described in greater detail with reference to the accompanying drawings. However, the technologies described herein are not to be limited to any specific exemplary embodiments, but should be understood as encompassing a variety of modifications, equivalents, and/or alternatives of the exemplary embodiments. In the following description, same drawing reference numerals are used for the same elements even in different drawings.

Further, when it is stated as "comprising" a certain element, unless otherwise specified, this means that another element may be additionally included, rather than precluding the same. Moreover, a variety of elements and regions are schematically illustrated in the drawings. Accordingly, the technical concept of the exemplary embodiments is not limited to relative sizes or intervals as illustrated in the appended drawings.

Figure 1B:
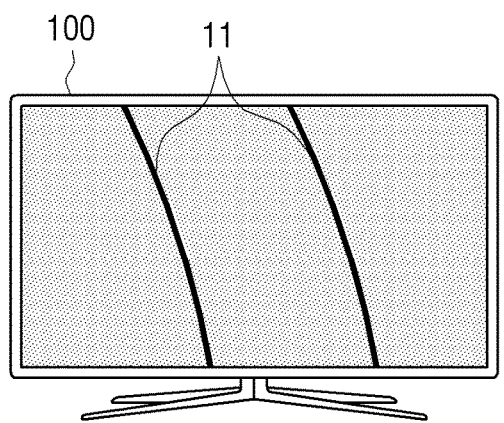

FIGS. 1A and 1B are schematic diagrams illustrating an operation of an image processing apparatus according to an exemplary embodiment.

Referring to FIGS. 1A and 1B, the image processing apparatus 100 may provide images with enhanced resolution and sharpness. Specifically, the image processing apparatus 100 can provide images with enhanced resolution and sharpness, by correcting a region within image data that has changed brightness value.

Referring to a region in FIG. 1A, the image processing apparatus 100 may provide an image with image degradation due to up-scaling. Specifically, the image processing apparatus 100 may suffer resolution degradation due to up-scaling such that the line region 10 is blurred to adjacent area.

In contrast, referring to a region in FIG. 1B, the image processing apparatus 100 can provide an image with enhanced resolution and sharpness with an image processing method according to an exemplary embodiment. Specifically, the image processing apparatus 100 may provide image with enhanced resolution and sharpness of the line region 11 by narrowing the width of the region with changed brightness value, and increasing the absolute value of the brightness value according to the image processing method of the exemplary embodiment.

While FIGS. 1A and 1B illustrate TV as an example of the image processing apparatus 100 for displaying processed image, the image processing apparatus 100 may be implemented as an image acquiring apparatus such as a settop box, a digital camera, and so on, and software system or image processing chip loaded on a display apparatus such as a mobile phone, a monitor, a billboard, and a tablet personal computer (PC).

Figure 2:
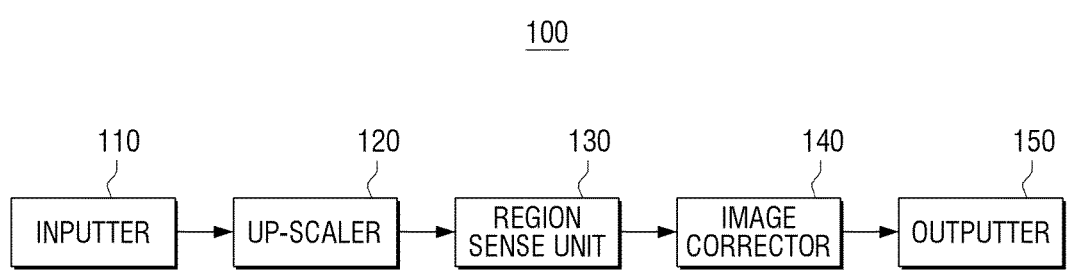
FIG. 2 is a block diagram illustrating a constitution of an image processing apparatus according to an exemplary embodiment.

FIG. 2 is a block diagram illustrating a constitution of an image processing apparatus according to an exemplary embodiment.

Referring to FIG. 2, the image processing apparatus 100 may include an inputter 110, an up-scaler 120, a region sense unit 130, an image corrector 140, and an outputter 150.

The inputter 110 may receive an input of image data. For example, the inputter 110 may receive input of image data from an external apparatus (not illustrated) via wire or wireless connection. In this case, the inputter 110 may be a communicator (not illustrated) when the external apparatus is a server for providing content image, or a broadcast receiver (not illustrated) when the external apparatus is a broadcast station or satellite for providing digital broadcast signals, or a USB port (not illustrated) provided in the image processing apparatus 100 when the external apparatus is a separate memory device such as USB memory and SD card that is connected to the image processing apparatus 100 to provide the image processing apparatus 100 with image data.

The inputter 110 may be a camera (not illustrated) provided in the image processing apparatus 100. In this case, the inputter 110 may input the images photographed by the camera and stored, or images photographed in real time to the image processing apparatus 100.

For example, if the inputted images have a resolution lower than the environment of the outputter 150 (e.g., a display), the up-scaler 120 up-scales the inputted images such that the inputted images can be outputted through the higher-resolution outputter. For example, when image with 1920*1080 resolution is inputted to the image processing apparatus 100 for display through the outputter with 3840*2160 resolution, horizontal and vertical pixels may be increased by two times, respectively. That is, one pixel in the inputted image may be implemented as four pixels. In this case, up-scaling can blur the edges such that unclear images may be provided.

The region sense unit 130 may sense the edge region and the line region within the image data by extracting the brightness information included in the up-scaled image data. In this case, the extracted brightness information may be brightness value of the pixels within the image data, or the gradient obtained as a result of brightness value differentiation.

Using the extracted brightness information, the image sense unit 130 may sense a region with a change in the brightness value within image data equal to or greater than a preset value to be the edge region or the line region. For example, the region sense unit 130 may sense a region in which a gradient of the brightness value within the image data does not change to be the edge region. The region sense unit 130 may sense a region in which a gradient of the brightness value within the image data changes to be the line region. The operation of the region sense unit 130 to sense the edge region and the line region within the image data will be described in detail below with reference to FIGS. 4 and 7 to 9.

The image corrector 140 may correct the regions sensed by the region sense unit 130 as the edge region and the line region within the image data in different manners, respectively. In this case, the image corrector 140 may narrow the width for the region sensed as the edge region within the image data, and narrow the width and increase the absolute value of the brightness value for the region sensed as the line region. The correction for the region sensed as the edge region within the image data will be described with reference to FIGS. 5 and 6, and the correction of the region sensed as the line region within the image data will be described below with reference to FIGS. 7 to 13.

The outputter 150 may output the image data corrected by the image corrector 140. The outputted 150 may be a display provided in the image processing apparatus 100, or a configuration that provides corrected images to a separate display apparatus (not illustrated) for display. Further, the outputter 150 may not directly provide the user with the image data corrected by the image corrector 140, but allow the corrected image data to be stored in a storage (not illustrated) provided in the image processing apparatus 100 and an external storage device (not illustrated) connected thereto.

The overall operations of the aforementioned plurality of elements may be controlled by a processor (not shown). Though it has been illustrated and described that operations respectively corresponding to the plurality of elements are performed, it can be implemented such that all the operations of the plurality of elements are performed by the processor according to various exemplary embodiments.

Figure 3:
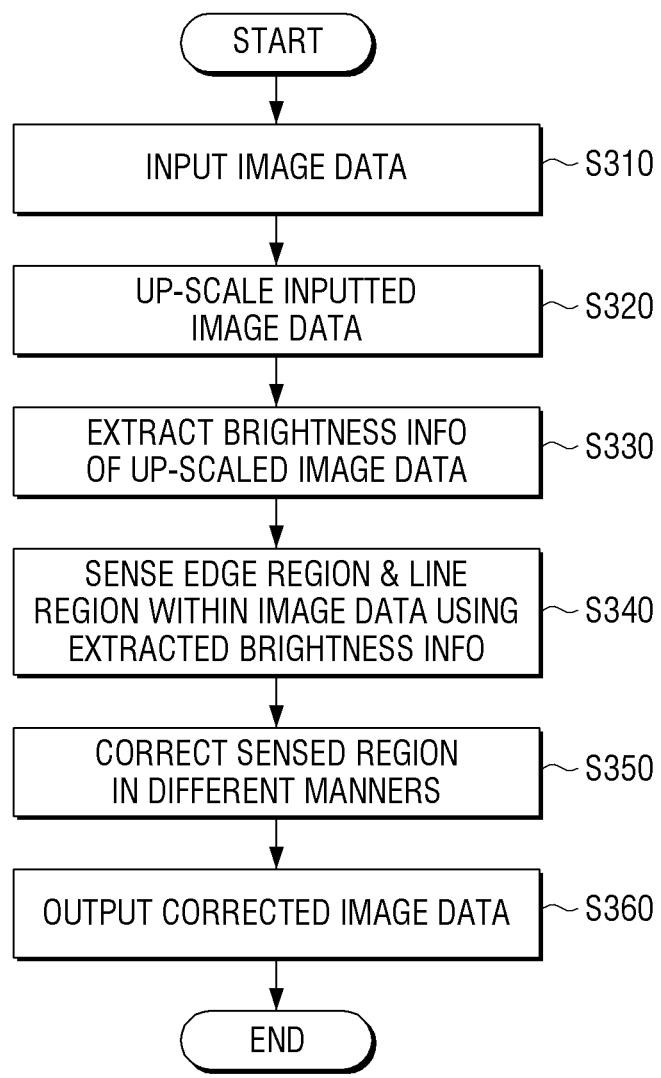
FIG. 3 is a schematic flowchart provided to explain an image processing method according to an exemplary embodiment.

FIG. 3 is a schematic flowchart provided to explain an image processing method according to an exemplary embodiment.

Referring to FIG. 3, the image processing apparatus receives an input of image data (operation S310). The input image data may include brightness information of the input image.

The image processing apparatus up-scales the inputted image data (operation S320). For example, when an image with a resolution lower than display environment is inputted, the image processing apparatus may up-scale the inputted image to enable display on a display with a higher resolution. In this case, the image may suffer resolution degradation due to up-scaling.

The image processing apparatus extracts brightness information of the up-scaled image data (operation S330). In this case, the extracted brightness information may be a brightness value of the pixels within the image data, or the gradient obtained as a result of differentiating the brightness value.

The image processing apparatus senses an edge region and a line region within the image data using the extracted brightness information (operation S340). In this case, the edge region and the line region within the image data may be sensed by using the symbol of the gradient of the extracted brightness value. Specifically, as illustrated in FIG. 3, the image processing apparatus may sense the edge region when the region has unchanged symbol of the gradient of the extracted brightness value, and sense the line region when the region has a changed symbol of the gradient of the extracted brightness value.

The image processing apparatus corrects the region sensed as the edge region and the region sensed as the line region within the image data in different manners, respectively (operation S350). In this case, the image processing apparatus may perform a correction in a manner of narrowing the width for the region sensed as the edge region within the image data. For example, for the region sensed as the edge region, the image processing apparatus may perform a correction of narrowing the width by moving one boundary of the edge region within the image data in a direction from outside toward the edge region. The manner of narrowing the width of the edge region within the image data will be described in detail below with reference to FIGS. 5 and 6.

Meanwhile, the image processing apparatus may perform a correction in a manner of narrowing the width and increasing the brightness value with respect to the region sensed as the line region within the image data. For example, the image processing apparatus may perform a correction of narrowing the width of the region sensed as the line region by moving the boundary on both sides of the edge region within the image data to the direction of the line region. In this case, the image processing apparatus may perform a correction of increasing the absolute value of the brightness value of the width-narrowed region. The manner of narrowing the width of the line region within the image data and increasing the absolute value of the brightness value will be described in detail below with reference to FIGS. 10 to 13.

The image processing apparatus outputs corrected image data (operation S360). In this case, the corrected image data may be outputted to a display (not illustrated) provided in the image processing apparatus, or may be outputted to a separate display apparatus (not illustrated) for display thereof.

Figure 4A:
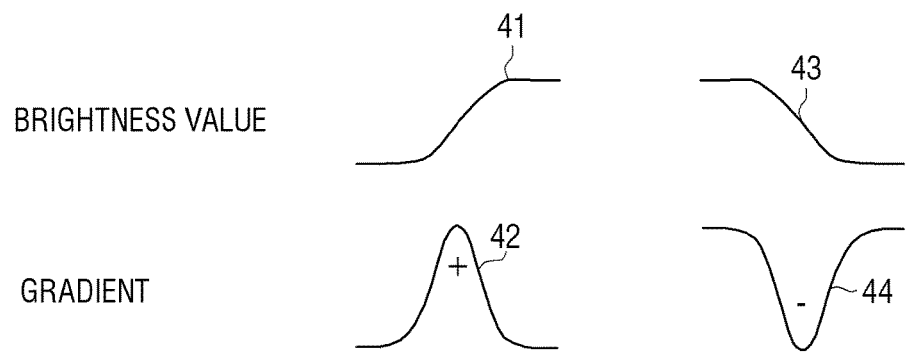
FIGS. 4A and 4B are diagrams representing definitions of an edge region and a line region within image data according to an exemplary embodiment.
Figure 4B:
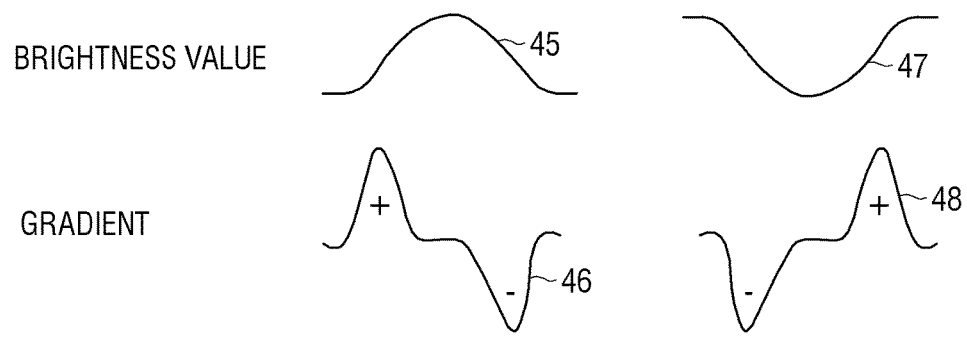

FIGS. 4A and 4B are diagrams representing definitions of the edge region and the line region within the image data according to an exemplary embodiment.

Referring to FIG. 4A, changes 41, 43 in the brightness values in the region sensed as the edge region within the image data are shown, together with the symbols 42, 44 of the gradients of the brightness values. For example, the image processing apparatus may sense a brightness value region 41 (i.e., a gradient region 42) to be the edge region as a boundary between a dark segment on the left side and a brightness segment on the right side when the brightness value region 41 has the brightness value within the image data changed from low segment into high segment, that is, when the gradient region 42 has the gradient of the brightness value maintained positive. Further, the image processing apparatus may sense a brightness value region 43 (i.e., a gradient region 44) to be the edge region as a boundary between a brightness segment on the left side and the dark segment on the right side, when the brightness value region 43 has the brightness value within the image data changed from high segment into low segment, i.e., when the gradient region 44 has the gradient of the brightness value maintained negative.

Referring to FIG. 4B, changes 45, 47 in the brightness values of the region sensed as the line region within the image data are shown, along with symbols 46, 48 of the gradients of the brightness values. For example, the image processing apparatus may sense a brightness value region 45 (i.e., a gradient region 46) to be a white line region present in a dark image when the brightness value region 45 has the brightness value within the image data being increased and then decreased, i.e., when the gradient region 46 has the gradient of the brightness value being changed from positive into negative. Further, the image processing apparatus may sense a brightness value region 47 (i.e., a gradient region 48) to be a black line region present in a dark image when the brightness value region 47 has the brightness value within the image data being decreased and then increased, i.e., when the gradient region 48 has the gradient of the brightness value being change from negative into positive.

Figure 5A:
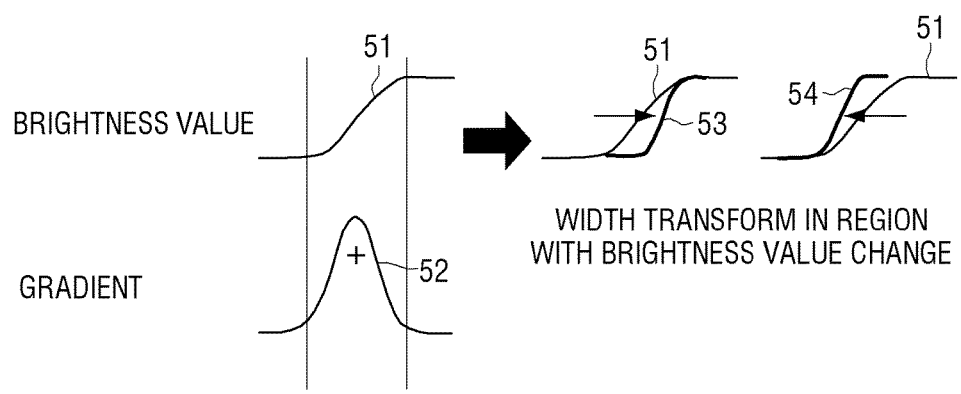
FIGS. 5A, 5B and 6 are diagrams provided to explain a method of correcting an edge region within image data according to an exemplary embodiment.
Figure 5B:
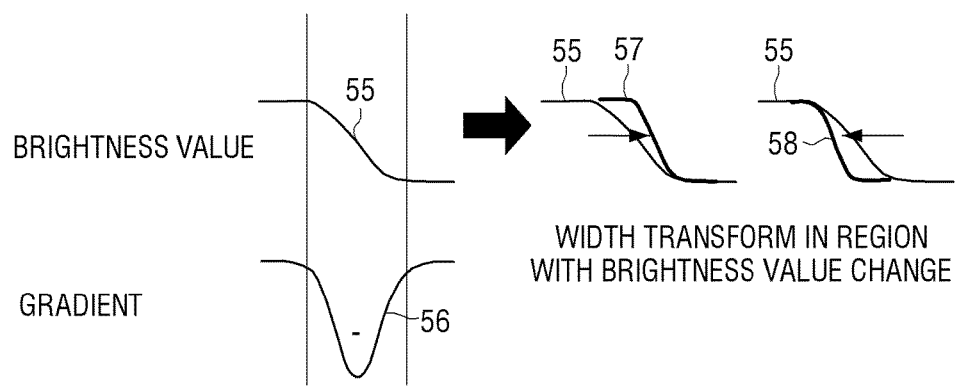
Figure 6:
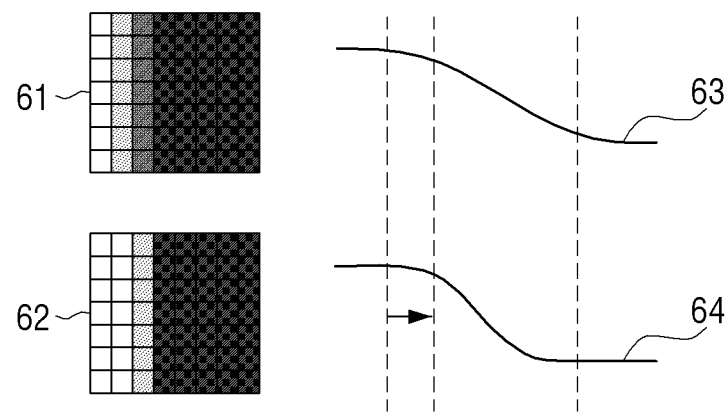

FIGS. 5 and 6 are diagrams provided to explain a method of correcting an edge region within image data according to an exemplary embodiment.

Referring to FIG. 5A, changes in the brightness value of a region 51 sensed as the edge region within the image data are shown. Specifically, the region sensed as the edge region may be a region in which the brightness value changes from low to high such that the symbol 52 of the gradient of the brightness value is maintained positive.

In this case, the image processing apparatus may perform a correction of narrowing the width of the region 51 sensed as the edge region within the image data. For example, the image processing apparatus may perform a correction of narrowing the width of the region sensed as the edge region according to changed brightness value, by moving any one of the boundaries on both sides of the region 51 sensed as the edge region within the image data in a direction from outside toward the edge region.

More specifically, the image processing apparatus may perform a correction of narrowing the width of the region sensed as the edge region, by moving (53) a boundary with the lower brightness value among the boundaries on both sides of the region 51 sensed as the edge region within the image data in a direction from outside toward the edge region, i.e., to a right side, or moving (54) a boundary with a higher brightness value in a direction from outside toward the edge region, i.e., to a left side. In this case, moving the boundary of the region may be performed by way of substituting the brightness value of the current pixel with the brightness value of the adjacent pixel.

Referring to FIG. 5B, changes in the brightness value of a region 55 sensed as the edge region within the image data are shown. Specifically, the region sensed as the edge region may be a region in which the brightness value changes from high to low such that the symbol 56 of the gradient of the brightness value is maintained negative.

In this case, the image processing apparatus may perform a correction of narrowing the width of the region 55 sensed as the edge region within the image data. For example, the image processing apparatus may perform a correction of narrowing the width of the region sensed as the edge region according to changed brightness value, by moving any one of the boundaries on both sides of the region 55 sensed as the edge region within the image data in a direction from outside toward the edge region.

More specifically, the image processing apparatus may perform a correction of narrowing the width of the region sensed as the edge region, by moving (57) a boundary with the higher brightness value among the boundaries on both sides of the region 55 sensed as the edge region within the image data in a direction from outside toward the edge region, i.e., to a right side, or moving (58) a boundary with a lower brightness value in a direction from outside toward the edge region, i.e., to a left side.

In this case, the image processing apparatus may determine degree of correction according to width, brightness value, gradient or brightness value, or user's settings of the region sensed as the edge region within the image data.

In the description provided above, the image processing apparatus performs a correction of narrowing the width of the region sensed as the edge region by moving only one boundary of the boundaries on both sides of the region sensed as the edge region within the image data in a direction from outside toward the edge region. However, the image processing apparatus may perform a correction of narrowing the width of the region sensed as the edge region by moving all the boundaries on both sides in a direction from outside toward the edge region.

FIG. 6 is a diagram illustrating an example of an image outputted as a result of performing a correction on a region sensed as the edge region within the image data according to an exemplary embodiment.

Referring to FIG. 6, an image 61 is illustrated, in which a region sensed as the edge region within the image data has resolution degradation due to up-scaling. The image 61 with the resolution degradation may be the image that has the edge region changed from a bright region into a dark region. In this case, the brightness value 63 of the image 61 with resolution degradation may be changed from a high brightness value of the bright region into a low brightness value of a dark region.

The image processing apparatus may provide a corrected image 62 as a result of performing correction on the region sensed as the edge region within the image data according to an exemplary embodiment. The corrected image 62 may have the enhanced resolution compared to the image 61 that has resolution degradation due to up-scaling. In this case, compared to the brightness value 63 of the image with resolution degradation, it is notable that the brightness value 64 of the corrected image 62 has a narrowed width of the brightness-changed region. As a result, the image processing apparatus may provide an image with the enhanced resolution of the region sensed as the edge region within the image data.

Figure 7:
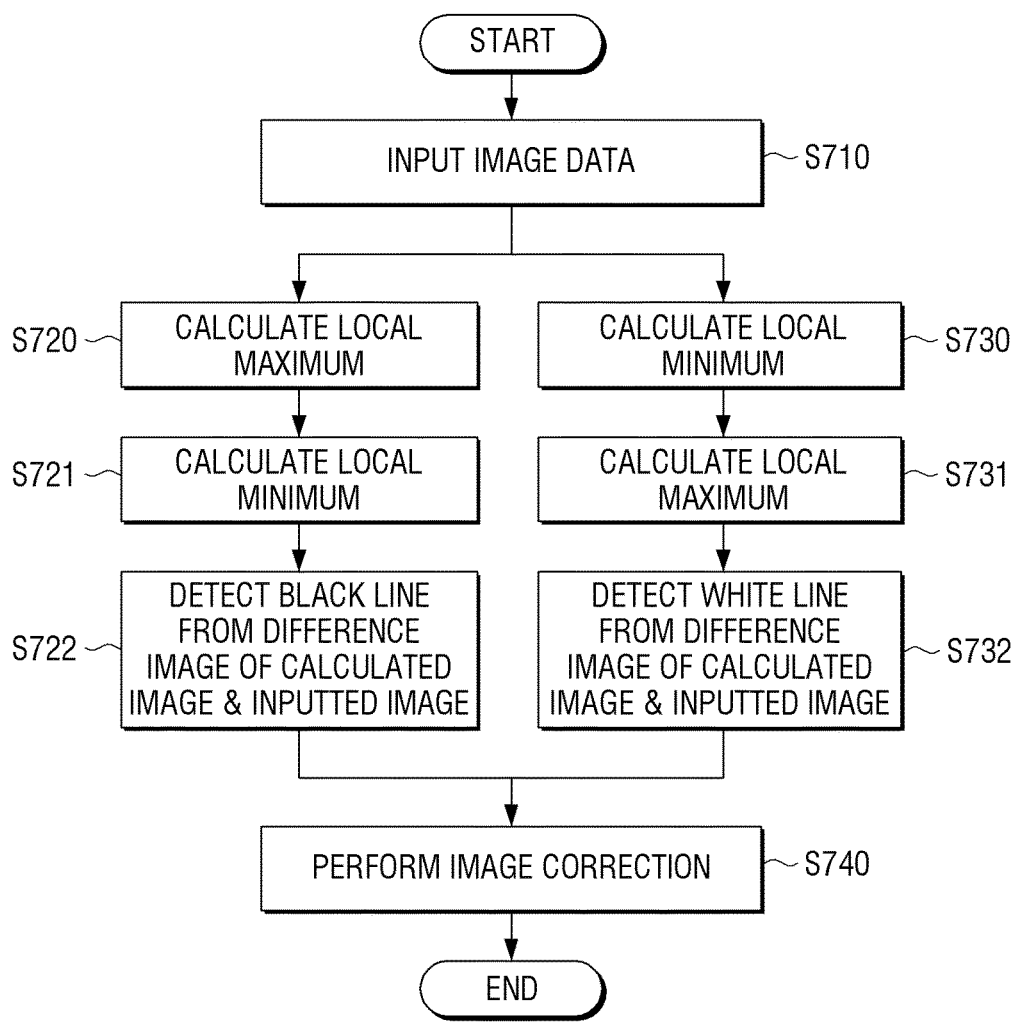
FIGS. 7 to 9 are flowcharts provided to explain a method of detecting a line region within image data according to an exemplary embodiment.
Figure 8:
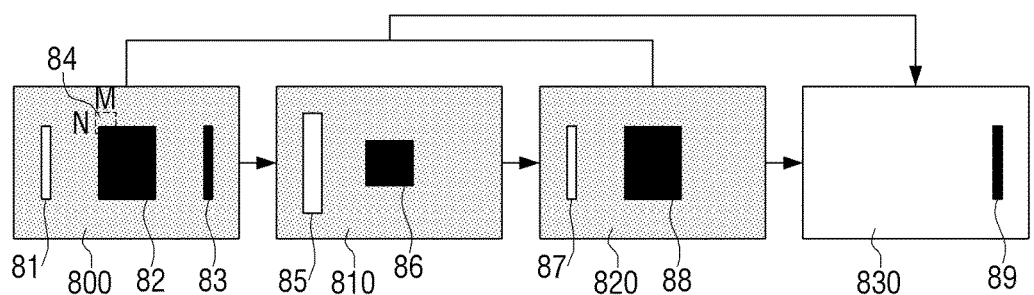
Figure 9:
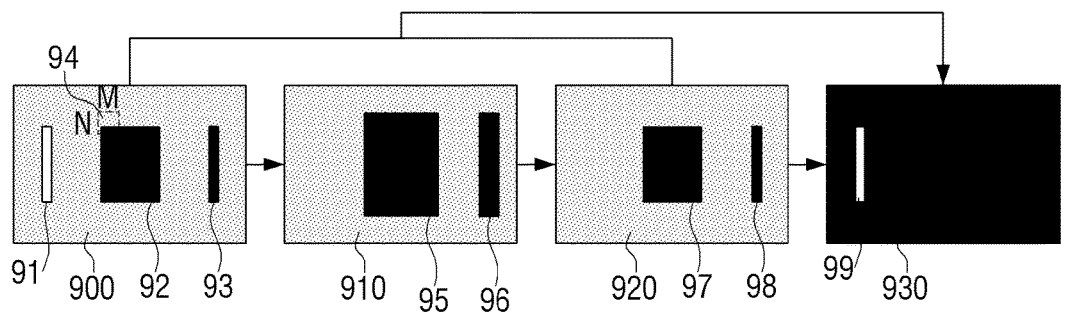

FIGS. 7 to 9 are flowcharts provided to explain a method of detecting a line region within image data according to an exemplary embodiment, in which black line and white line are distinguished in such detection.

Referring to FIGS. 7 and 8, the image processing apparatus receives an input of image data (operation S710). Next, the image processing apparatus calculates local maximum for the inputted image data (operation S720). For example, for an inputted image 800 including a white line 81, a black line 83, and a black region 82 on a gray background, the local maximum is calculated across the entire inputted image 800 using M×N local window 84. The local window 84 refers to a small region that moves across the entire inputted image 800 for local maximum or local minimum, and the size of the local window 84 may be greater than the widths of the lines 81, 83 and smaller than the width of the black region 82.

Specifically, the local maximum may involve the process of substituting the brightness values of the all pixels within the local window 84 with the highest brightness value within the local window. For example, when the local window 84 includes a portion of the white line 81 having brightness value 255 and the gray region having brightness value 128, all pixels that have brightness value 128 within the local window 84 may be substituted such that all pixels may have brightness value 255, the highest brightness value within the local window 84. When the local window 84 includes the gray region having brightness value 128 and the black region having brightness value 0, the pixels having brightness value 0 may be substituted such that the pixels may have brightness value 128. As a result, a resultant image 810 of calculating the local maximum the inputted image 800 may include enlarged white line 85 and reduced black region 86, and the black line 83 included in the inputted image 800 may be disappeared.

Next, the image processing apparatus calculates local minimum with the resultant image of the local maximum (operation S721). In this case, the local minimum is calculated with M×N local window 84 across the entire image 810 including the enlarged white line 85 and the reduced black region 86 on the gray background.

Specifically, the local minimum may involve the process of substituting all pixels within the local window 84 with the lowest brightness value within the local window. For example, when the local window 84 includes a portion of the white line 85 having brightness value 255 and the gray region having brightness value 128, all pixels that have brightness value 255 within the local window 84 may be substituted such that all pixels may have brightness value 128, the lowest brightness value within the local window 84. Likewise, when the local window 84 includes the gray region having brightness value 128 and the black region having brightness value 0, the pixels having brightness value 128 may be substituted such that the pixels may have brightness value 0. As a result, a resultant image 810 of calculating the local minimum with the local maximum-calculated image 810 may include reduced white line 87 and enlarged black region 88 in the same size as the white line 81 and the black region 82 included in the original inputted image 800.

Next, the image processing apparatus detects a black line from a difference image between the inputted image and the local minimum-calculated image 820 obtained as a result of calculating the local maximum with the inputted image (operation S722). Specifically, the image processing apparatus may obtain a difference image 830 by subtracting the local minimum-calculated image 820 from the inputted image 820, and detect a region having negative pixel values in the obtained difference image as the black line 89. Alternatively, the image processing apparatus may obtain a difference image by subtracting the inputted image 800 from the local minimum-calculated image 820, and detect a region having positive pixel value in the obtained difference image as the black line 89.

Meanwhile, referring to FIGS. 7 and 9, the image processing apparatus calculates the local minimum with respect to the inputted image data (operation S730), and the image processing apparatus may detect the white line 91 included in the inputted image 900 by calculating local maximum (operation S731). In this case, the local minimum may be calculated across the entire inputted image 900 including the white line 91, the black line 93, and the black region 92 on the gray background, using M×N local window 94.

Specifically, the image processing apparatus may calculate local minimum with the inputted image 900. For example, when the local window 94 includes a portion of the white line 91 having brightness value 255 and the gray region having brightness value 128, all pixels having brightness value 128 within the local window 94 may be substituted such that all pixels may have 128, the lowest brightness value within the local window 94. Likewise, when the local window 94 includes the gray region having brightness value 128 and the black region having brightness value 0, the pixels having brightness value 128 may be substituted such that the pixels may have brightness value 0. As a result, the resultant image 910 of calculating local minimum with the inputted image 900 may include the enlarged black region 95 and the enlarged black line 96, and the white line 91 included in the inputted image 900 may be disappeared.

Next, the image processing apparatus calculates local maximum with the local minimum-calculated image 910 (operation S710). In this case, the local maximum is calculated across the entire image 910 that includes the enlarged black region 95 and the enlarged black line 96 on the gray background, by using M×N local window 94.

Specifically, the local maximum may involve the process of substituting the brightness values of all pixels within the local window 94 with the highest brightness value within the local window. For example, when the local window 94 includes the black region 95 and the black line 96 having brightness value 0, and the gray region having brightness value 128, all pixels having brightness value 0 within the local window 94 may be substituted such that the pixels may have brightness value 128, the highest brightness value within the local window 94. As a result, the resultant image 920 of calculating local maximum with the local minimum-calculated image 910 includes the reduced black region 97 and the reduced black line 98 in the same size as the black region 92 and the black line 93 included in the original inputted image 900.

Next, the image processing apparatus detects a white line from a difference image between the inputted image 900 and the image 920 obtained after calculating local minimum with the inputted image and then performing local maximum (operation S710). Specifically, the image processing apparatus may obtain the difference image 930 by subtracting the calculated image 920 from the inputted image 900 and detect the region having positive pixel value within the obtained difference image to be the white line 99. Alternatively, the image processing apparatus may obtain the difference image by subtracting the inputted image 900 from the calculated image 920 and detect the region having negative pixel value within the difference image to be the white line 99.

Next, the image processing apparatus performs image correction for the detected black line region and white line region (operation S740). The method of correcting the region detected as the line region within the image data will be described in detail below with reference to FIGS. 10 to 13.

Although exemplary embodiments have been described with reference to an example in which local maximum and local minimum are used to detect the white line and the black line included in the inputted image, it is not limited thereto, and the white line and the black line may be detected by using changes in the symbol of the gradient of the brightness signal. For example, the image processing apparatus may detect a region in which the symbol of the gradient of the brightness signal changes from positive into negative to be the white line, and detect the region having symbol changed from negative into positive to be the black line.

FIGS. 10 to 13 are diagrams provided to explain a method of correcting detected line region within the image data according to an exemplary embodiment.

Figure 10:
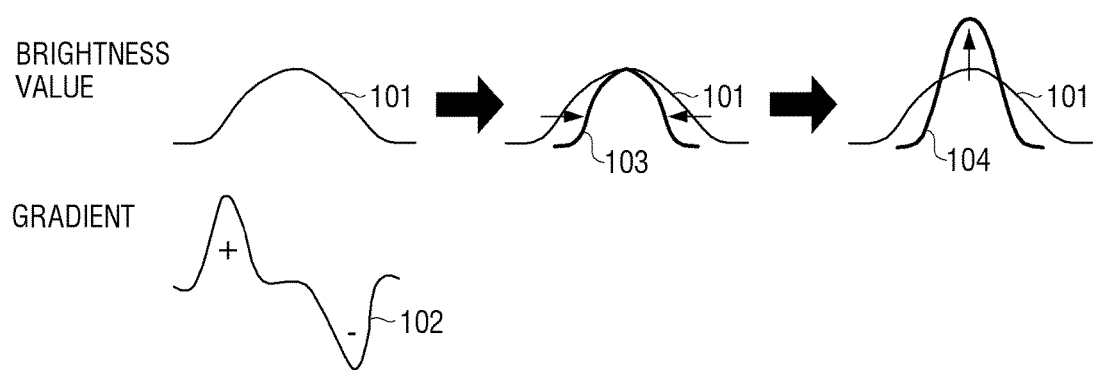
FIGS. 10 to 13 are diagrams provided to explain a method of correcting the detected line region within image data according to an exemplary embodiment.
Figure 11:
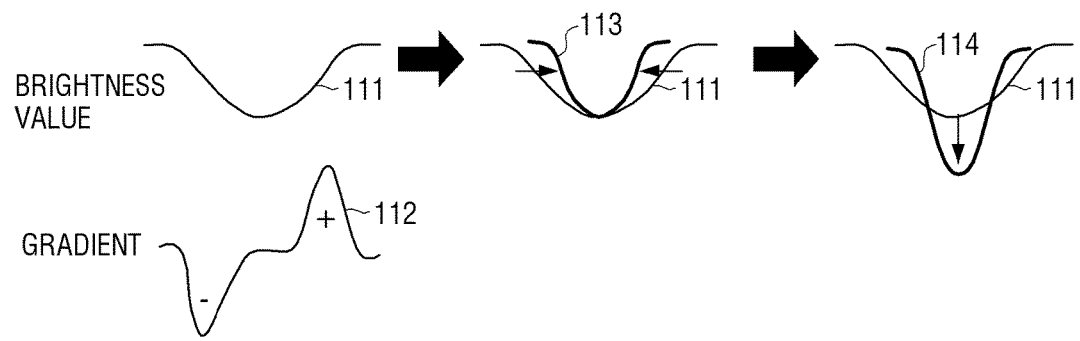

Referring to FIGS. 10 and 11, with respect to the region sensed as the line region within the image data, the image processing apparatus may performs a correction of narrowing the width of the sensed region by moving boundaries on both sides of the line region in a direction from outside toward the line region. The correction method according to types of line in the region sensed as the line region within the image data will be described in detail below with reference to FIGS. 10 and 11.

FIG. 10 is a diagram provided to explain a method of correcting a white line region detected within the image data.

Referring to FIG. 10, the image processing apparatus detects a region in the inputted image data in which brightness value increases and then decreases. That is, the image processing apparatus detects the white line region 101 within the image data. Specifically, since the symbol 102 of the gradient of the region having changed brightness value within the image data changes from positive into negative, the image processing apparatus may sense it to detect the region sensed as the white line region within the image data.

The image processing apparatus may obtain the white line region 103 with narrowed width, by performing the correction of narrowing the width of the region 101 detected as the white line region within the image data. Specifically, with respect to the region sensed as the white line region within the image data, the image processing apparatus may perform the correction of narrowing the width of the region sensed as the line region, by moving the boundaries on both sides of the white line region in a direction from outside toward the line region. More specifically, in performing the correction of narrowing the width of the region sensed as the white line region by moving the boundaries of the region sensed as the white line region, the image processing apparatus may perform the correction by moving a boundary of the region having gradient of the brightness with positive symbol to a right side and moving the boundary of the region having negative symbol to a left side.

The image processing apparatus may obtain the white line region 104 with increased brightness value by performing the correction of increasing the absolute value of the brightness value of the white line region 103 after the correction of narrowing the width. As a result, the image processing apparatus may provide the image with both enhanced resolution as well as enhanced sharpness by preserving pixel energy of the white line region. The method of correcting by increasing the absolute value of the brightness value will be described in detail below with reference to FIG. 12.

Referring to FIG. 11, the image processing apparatus detects a region in the inputted image data in which the brightness value decreases and then increases, i.e., the black line region 111 in the image data. Specifically, because the symbol 112 of the gradient of the region having changed brightness value within the image data changes from negative into positive, the image processing apparatus may sense it to detect the region sensed as the black line region within the image data.

The image processing apparatus may obtain the black line region 113 with reduced width by performing the correction of narrowing the width of the region 111 detected as the black line region within the image data. Specifically, with respect to the region sensed as the black line region in the image data, the image processing apparatus may perform the correction of narrowing the width of the region sensed as the line region, by moving the boundaries on both sides of the black line region in a direction from outside toward the line region. More specifically, the image processing apparatus may perform the correction of narrowing the width of the region sensed as the black line region by moving the boundaries of the region sensed as the black line region, i.e., by moving a boundary of the region having gradient of the brightness value with negative symbol to a right side, and moving the boundary of the region having gradient with positive symbol to a left side.

The image processing apparatus may obtain the black line region 114 having further decreased brightness value by performing the correction of increasing the absolute value of the brightness value of the black line region 113 after the correction of narrowing the width. As a result, the image processing apparatus may provide the image with enhanced resolution as well as enhanced sharpness by preserving pixel energy of the black line region. The correction method of increasing the absolute value of the brightness value will be described in detail below with reference to FIG. 12.

In this case, the image processing apparatus may determine degree of correction according to width, brightness value, gradient or brightness value, or user's settings of the region sensed as the edge region within the image data.

Figure 12:
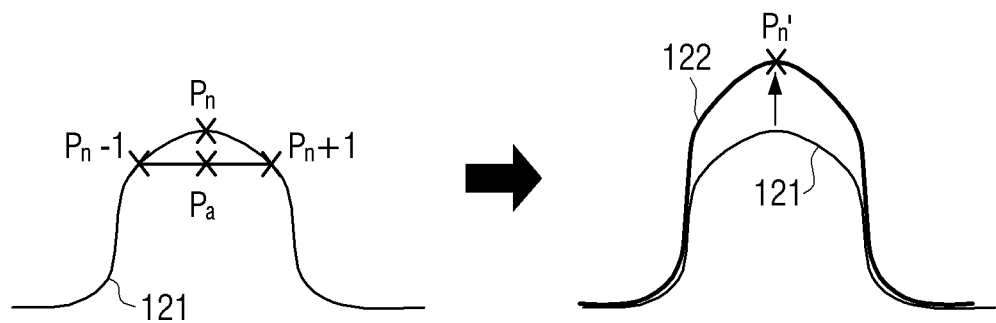

FIG. 12 is a diagram provided to explain a correction method of increasing the absolute value of the brightness value of the region sensed as the line region within the image data according to an exemplary embodiment.

Referring to FIG. 12, after the correction of narrowing the width of the region sensed as the line region within the image data, the image processing apparatus may perform the correction of increasing the brightness value of the corrected region. Specifically, the image processing apparatus obtain an average (Pa) of the brightness value (Pn−1, Pn+1) of the adjacent pixels left and right to a reference pixel with 0 gradient of corrected brightness value. The image processing apparatus calculates a difference between the brightness value (Pn) of the reference pixel and the average (Pa) of the brightness values of adjacent pixels on left and right sides. The image processing apparatus may perform the correction of increasing the brightness value of the region after the correction of narrowing the width, by adding a preset ratio ($\alpha \times (Pn-Pa)$) of the calculated difference to the brightness value (Pn) of the reference pixel.

Although the correction of increasing the brightness value of the region sensed as the white line region within the image data has been described above, the exemplary embodiment is equally applicable to a region sensed as the black line region. Because the difference (Pn−Pa) between the brightness value of the reference pixel in the region sensed as the black line region and the average of the brightness values of adjacent pixels on left and right sides is a negative value, when a preset ratio of the calculated difference is added to the brightness value of the reference pixel, the absolute value of the brightness value will increase. Accordingly, the image processing apparatus may provide the image with enhanced sharpness by preserving pixel energy, even for the region sensed as the black line region.

Although the correction of increasing the absolute value of the brightness value of the region sensed as the line region within the image data using the brightness value of the adjacent pixels to the reference pixel has been described, it is not limited thereto, and a correction of increasing the brightness value to have the equal integral value as the integral value of the region sensed as the line region of the inputted image data may also be implemented.

Figure 13:
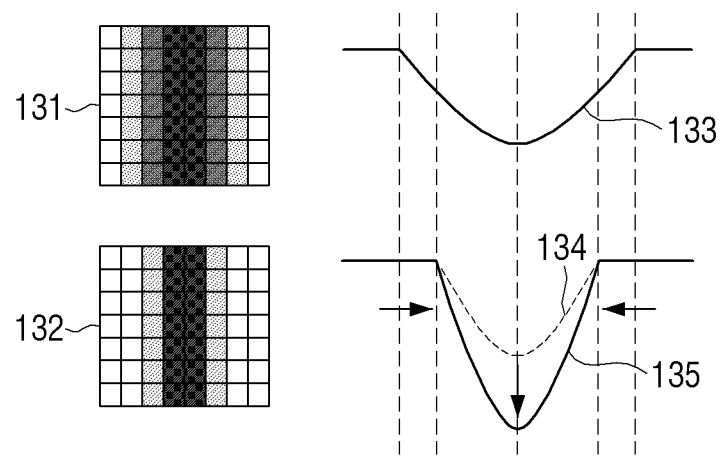

FIG. 13 is a diagram illustrating an image outputted after the correction of the region sensed as the line region within the image data according to an exemplary embodiment.

Referring to FIG. 13, an image 131 has the resolution degradation due to up-scaling of the region sensed as the line region within the image data. The image 131 with the resolution degradation may be the image having black line region. In this case, the brightness value 133 of the image 131 with the resolution degradation may include a region in which it decreases and then increases.

The image processing apparatus may provide the corrected image 132 after the correction of the region sensed as the line region within the image data according to an exemplary embodiment. The corrected image 132 may have an enhanced resolution compared to the image 131 that has the resolution degradation due to up-scaling. In this case, from the brightness value 135 of the corrected image 132, it is understood that the correction of narrowing the width of the region with changed brightness from the brightness value 134 of the image with the resolution degradation has been performed, and to the brightness value 135 obtained as a result, the correction of increasing the absolute value of the brightness value has been performed. As a result, the image processing apparatus can provide an image with enhanced resolution and sharpness of the region sensed as the line region within the image data.

In various exemplary embodiments described above, the image processing apparatus can correct an image with the resolution degradation due to up-scaling of the inputted image and thus can provide an image with enhanced resolution as well as enhanced sharpness without causing side-effect such as shoot or ringing during the transient segment transformation.

While not restricted thereto, the methods according to exemplary embodiments may be implemented in a form of program instructions that may be executed with a variety of computer means, and recorded on a non-transitory computer-readable medium. The non-transitory computer-readable medium may include program instructions, data files, data structures, and so on along or in combination. For example, the non-transitory computer-readable medium may be stored, regardless of whether this is erasable or re-recordable, on a volatile or non-volatile storage device such as storage such as ROM, and so on, or for example, a memory such as RAM, memory chip, device or integrated circuit, or a storage medium optically or magnetically recordable and at the same time readable on a machine (e.g., computer), such as CD, DVD, magnetic disk, magnetic tape, and so on. It is understandable that a memory that may be included in a mobile terminal is one example of a machine-readable storage medium that is suitable for storing the program or programs including instructions for implementing the exemplary embodiments. The program instructions recorded on the medium may be specially designed and configured for the exemplary embodiments, or known and available by those skilled in the field of computer software.

The foregoing exemplary embodiments and advantages are merely exemplary and are not to be construed as limiting the exemplary embodiments. Also, the description of the exemplary embodiments is intended to be illustrative, and not to limit the scope of the claims, and many alternatives, modifications, and variations will be apparent to those skilled in the art.

What is claimed is:

1. An image processing apparatus, comprising:
a storage; and
a processor configured to up-scale image data, to extract brightness information of the up-scaled image data, to identify
an edge region and a line region within the up-scaled image data based on a brightness value of the extracted brightness information and a gradient of the brightness value,
to correct the up-scaled image data in different correction methods for each of the edge region and the line region, and to store the corrected image data in the storage.

2. The image processing apparatus of claim 1, wherein the processor is configured to identify from the extracted brightness information a region having a brightness value changed by a preset value or greater, identify it as the edge region if a symbol of a gradient of the brightness value within the identified region is maintained, and identify it as the line region if the symbol of the gradient of the brightness value within the identified region is changed.

3. The image processing apparatus of claim 1, wherein, with respect to the region identified as the edge region, the processor is configured to perform a correction of narrowing a width of the identified region by moving one of boundaries of the edge region in a direction from outside toward the edge region.

4. The image processing apparatus of claim 1, wherein, with respect to the region identified as the line region, the processor is configured to perform a correction of narrowing a width of the identified region by moving boundaries on both sides of the line region in a direction from outside toward the line region.

5. The image processing apparatus of claim 4, wherein, with respect to the region identified as the line region, the processor is configured to distinguish whether the line is a black line or a white line.

6. The image processing apparatus of claim 5, wherein the processor is configured to narrow a width of the identified region, if the line is a black line, by moving a boundary of a region having a gradient brightness value with a negative symbol to a right side and moving a boundary of a region having the gradient brightness value with a positive symbol to a left side, and narrow the width of the identified region, if the line is a white line, by moving a boundary of the region having the gradient of brightness value with a negative symbol to the left side, and moving a boundary of the region having the gradient of brightness value with a positive symbol to the right side.

7. The image processing apparatus of claim 4, wherein, with respect to the region identified as the line region, the processor is further configured to perform a correction of increasing an absolute value of the brightness value of the region having the narrowed width.

8. The image processing apparatus of claim 7, the processor is configured to perform the correction of increasing the absolute value of the brightness value of the region by obtaining an average of brightness values of adjacent pixels right and left to a reference pixel having a zero gradient of the brightness value within the region of the narrowed width, and a difference between the brightness value of the reference pixel and the average, and adding a preset ratio of the difference to the brightness value of the reference pixel.

9. An image processing method of an image processing apparatus, the method comprising:
up-scaling image data;
extracting brightness information of the up-scaled image data;
identifying an edge region and a line region within the up-scaled image data based on a brightness of the extracted brightness information and a gradient of the brightness value;
correcting the up-scaled image data in different correction methods for each of the edge region and the line region; and
storing the corrected image data.

10. The image processing method of claim 9, wherein the identifying the edge region and the line region comprises identifying, from the extracted brightness information, a region having a brightness value changed by a preset value or greater, and identifying it as the edge region if a symbol of a gradient of the brightness value within the identified region is maintained, and identifying it as the line region if the symbol of the gradient of the brightness value within the identified region is changed.

11. The image processing method of claim 9, wherein, with respect to the region identified as the edge region, the correcting the up-scaled image comprises performing a correction of narrowing a width of the identified region by moving one of boundaries of the edge region in a direction from outside toward the edge region.

12. The image processing method of claim 9, wherein, with respect to the region identified as the line region, the correcting the up-scaled image comprises performing a correction of narrowing a width of the identified region by moving boundaries on both sides of the line region in a direction from outside toward the line region.

13. The image processing method of claim 12, wherein, with respect to the region identified as the line region, the identifying the edge region and the line region comprises distinguishing whether the line is a black line or a white line.

14. The image processing method of claim 13, wherein the correcting the up-scaled image comprises, if the line is a black line, moving a boundary of a region having a gradient brightness value with a negative symbol to a right side and moving a boundary of a region having the gradient brightness value with a positive symbol to a left side, and if the line is a white line, the correcting the up-scaled image comprises moving a boundary of the region having the gradient of brightness value with a negative symbol to the left side, and moving a boundary of the region having the gradient of brightness value with a positive symbol to the right side.

15. The image processing method of claim 12, wherein, with respect to the region identified as the line region, the correcting the up-scaled image comprises performing a correction of increasing an absolute value of the brightness value of the region having the narrowed width.

16. The image processing method of claim 15, wherein the correcting the up-scaled image comprises performing the correction of increasing the absolute value of the brightness value of the region by obtaining an average of brightness values of adjacent pixels right and left to a reference pixel having a zero gradient of the brightness value within the region of the narrowed width, and a difference between the brightness value of the reference pixel and the average, and adding a preset ratio of the difference to the brightness value of the reference pixel.

17. A non-transitory computer-readable recording medium comprising a program to implement an image processing method of an image processing apparatus, the method comprising:
up-scaling image data;
extracting brightness information of the up-scaled image data;
identifying an edge region and a line region within the up-scaled image data based on a brightness value of the extracted brightness information and a gradient of the brightness value;
correcting the up-scaled image data in different correction methods for each of the edge region and the line region; and
storing the corrected image data.

* * * * *